(12) United States Patent
Sakurai et al.

(10) Patent No.: US 10,802,139 B2
(45) Date of Patent: Oct. 13, 2020

(54) RADAR APPARATUS

(71) Applicant: DENSO CORPORATION, Kariya, Aichi-pref. (JP)

(72) Inventors: Kazumasa Sakurai, Nishio (JP); Kazushi Kawaguchi, Nishio (JP); Toshiya Sakai, Nishio (JP); Yuji Sugimoto, Nishio (JP); Asahi Kondo, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 323 days.

(21) Appl. No.: 15/748,090

(22) PCT Filed: Jul. 11, 2016

(86) PCT No.: PCT/JP2016/070378
§ 371 (c)(1),
(2) Date: Jan. 26, 2018

(87) PCT Pub. No.: WO2017/018182
PCT Pub. Date: Feb. 2, 2017

(65) Prior Publication Data
US 2018/0224542 A1     Aug. 9, 2018

(30) Foreign Application Priority Data
Jul. 30, 2015 (JP) .................... 2015-150720
Feb. 17, 2016 (JP) .................... 2016-028229

(51) Int. Cl.
*G01S 13/93* (2020.01)
*G01S 13/931* (2020.01)
(Continued)

(52) U.S. Cl.
CPC ............ *G01S 13/931* (2013.01); *G01S 7/023* (2013.01); *G01S 7/024* (2013.01); *G01S 7/038* (2013.01);
(Continued)

(58) Field of Classification Search
CPC .. G01S 13/93; G01S 13/931; G01S 2007/027; G01S 2013/9375;
(Continued)

(56) References Cited

U.S. PATENT DOCUMENTS

2009/0140912 A1    6/2009   Kato et al.
2017/0352950 A1   12/2017   Sakurai et al.
(Continued)

FOREIGN PATENT DOCUMENTS

JP     H05-157990 A    6/1993
JP     H11-94926 A     4/1999
(Continued)

*Primary Examiner* — Timothy A Brainard
(74) *Attorney, Agent, or Firm* — Maschoff Brennan

(57) ABSTRACT

An antenna apparatus has an antenna unit. The antenna unit transmits or receives a probe wave made of an electromagnetic wave. A magnet is disposed at a location through which the probe wave to be received by the antenna unit passes. The magnet works to generate a magnetic field along a direction in which the probe wave propagates. A polarizing filter is arranged on an opposite side of a magnetic body to the antenna unit. This minimizes the interference between an emitted wave and a reflected wave created by a cover, such as a bumper, regardless of the configuration of the cover.

11 Claims, 15 Drawing Sheets

(51) Int. Cl.
*G01S 7/02* (2006.01)
*H01Q 15/12* (2006.01)
*H01Q 15/24* (2006.01)
*G01S 7/03* (2006.01)
*H01Q 1/32* (2006.01)
*H01Q 1/42* (2006.01)

(52) U.S. Cl.
CPC ............. *H01Q 1/3233* (2013.01); *H01Q 1/42* (2013.01); *H01Q 15/12* (2013.01); *H01Q 15/246* (2013.01); *G01S 2007/027* (2013.01); *G01S 2013/93271* (2020.01); *G01S 2013/93275* (2020.01)

(58) Field of Classification Search
CPC .. G01S 2013/9389; G01S 7/023; G01S 7/024; G01S 7/03; G01S 7/038; H01P 1/175; H01Q 15/12; H01Q 15/246; H01Q 1/3233; H01Q 1/42
See application file for complete search history.

(56) References Cited

U.S. PATENT DOCUMENTS

2018/0013196 A1   1/2018  Sakurai et al.
2018/0314010 A1*  11/2018 Thylen ............... G02B 6/29338

FOREIGN PATENT DOCUMENTS

| JP | 2008-122188 A | 5/2008 |
| JP | 2009-103456 A | 5/2009 |
| JP | 2015-200512   | 11/2015 |
| JP | 2017-044527   | 3/2017 |
| JP | 2017-046107   | 3/2017 |
| JP | 2017-150894   | 8/2017 |

* cited by examiner

RADAR APPARATUS

TECHNICAL FIELD

The present invention generally relates to a radar apparatus which transmits an electromagnetic wave and receives a return thereof to detect an object.

BACKGROUND ART

Automotive radar apparatuses may be mounted inside a cover, such as a bumper of the vehicle, in use. This may encounter a risk that a wave reflected on the bumper interferes with a wave outputted directly from the radar apparatus, which results in deterioration in radar performance.

In order to eliminate the above problem, Japanese Patent First Publication No. 2009-103456 teaches a technique of aligning the bumper at an angle to regulate the orientation of the reflected wave, thereby minimizing the interference between the direct wave and the reflected wave.

SUMMARY OF THE INVENTION

Problem to be Solved by the Invention

The prior art, however, requires the alignment of the bumper. Vehicles equipped with a non-aligned bumper, thus, face the problem that the above interference is not eliminated. The prior art also encounters a problem that the reflected wave propagates upward or downward, so that it is further reflected on a road sign or the ground surface and then returned back to the radar apparatus, which cause noise.

The invention was made in view of the above problems. It is an object to provide a radar apparatus which minimizes interference between a wave emitted from a radar and a wave reflected from a cover, such as a bumper, regardless of the configuration of the cover.

Means for Solving the Problem

A radar apparatus of the invention comprises: an antenna unit (3, 3a, 3b); a magnetic body (41, 71, 81, 91); magnets (42, 72, 82-87, 92-95); and a polarizing filter (5). The antenna unit transmits or receives a probe wave made of an electromagnetic wave. The magnetic body is arranged at a location where the probe wave transmitted or received by said antenna unit passes. The magnets generate a magnetic field in a direction in which the probe wave propagates. The polarizing filter is arranged on an opposite side of the magnetic body to the antenna unit.

In the above structure, a plane of polarization of a direct wave that is the probe wave emitted from the antenna unit is rotated by Faraday effect when passing through the magnetic body to which the magnetic field is applied. Subsequently, the direct wave then passes through the polarizing filter, so that the direct wave which has a specified plane of polarization is emitted from the radar apparatus. The direct wave has a portion reflected on a cover such as a bumper. This reflected wave passes through the polarizing filter and the magnetic body, so that the plane of polarization of the reflected wave is rotated again when passing through the magnetic body. The rotation of the plane of polarization, as achieved by the Faraday effect, is non-reciprocal, so that when passing through the magnetic body, the reflected wave is not subjected to backward rotation by an angle of rotation of the direct wave when passing through the magnetic body, but is rotated in the forward direction. The reflected wave which has passed through the magnetic body is reflected again on the surface of the antenna unit and then passes through the magnetic body again, so that the plane of polarization thereof is rotated. This causes the plane of polarization of the re-reflected wave to have an angle different (ideally, by 90 degrees) from that of the re-reflected wave when passing through the polarizing filter. The re-reflected wave is, thus, blocked by the polarizing filter, thereby eliminating the interference between a wave emitted from the radar apparatus through the cover and a wave reflected inside the cover and then radiated through the cover.

The radar apparatus of the invention is, therefore, capable of reducing deterioration in radar performance arising from the interference between the direct wave and the reflected wave created by the cover regardless of the configuration of the cover.

The radar apparatus is also capable of eliminating generation of a reflected wave directed vertically from the bumper which will cause noise.

Reference symbols noted in brackets in claims correspond to specific means in embodiments which will be described later and do not limit a technical scope of the invention.

BRIEF DESCRIPTION OF THE DRAWINGS

FIG. 2 is a view showing a structure of a radar apparatus in the first embodiment.

EMBODIMENT FOR CARRYING OUT THE INVENTION

Embodiments to which the invention is applied will be described below using the drawings.

1. First Embodiment

[1.1 Entire Structure]

Figure 1:
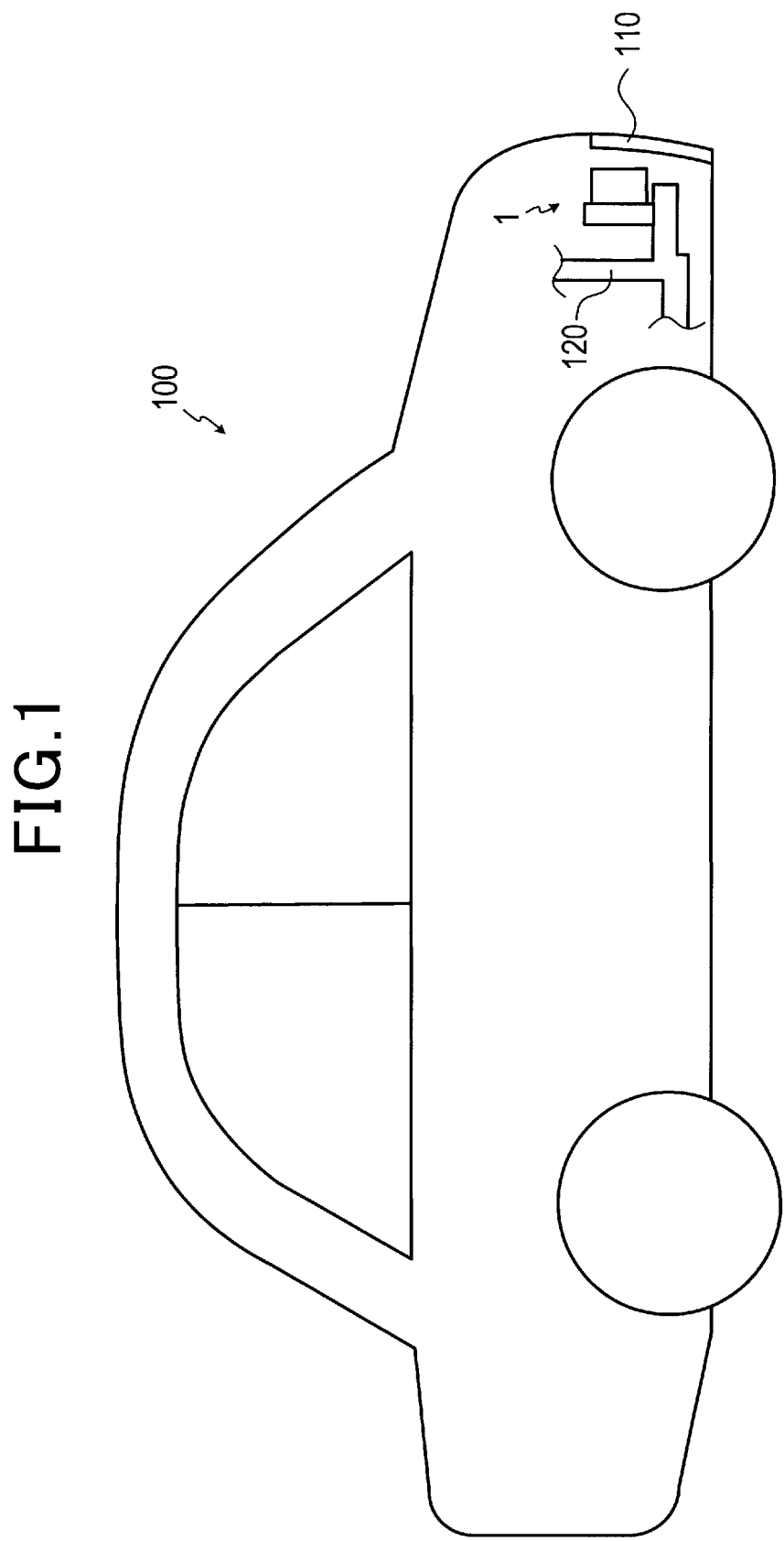
FIG. 1 is an explanatory view which illustrates use of a radar apparatus.

The automotive radar apparatus 1 of this embodiment is, as illustrated in FIG. 1, disposed inside the front bumper 110 of the vehicle 100 and firmly secured by the retaining member 120 which is made as a portion of a frame of the vehicle 100. The radar apparatus 1 works to transmit a probe wave (i.e., a radar wave) made of electromagnetic wave through the bumper 110.

[1.2 Radar Apparatus]

Figure 2A:
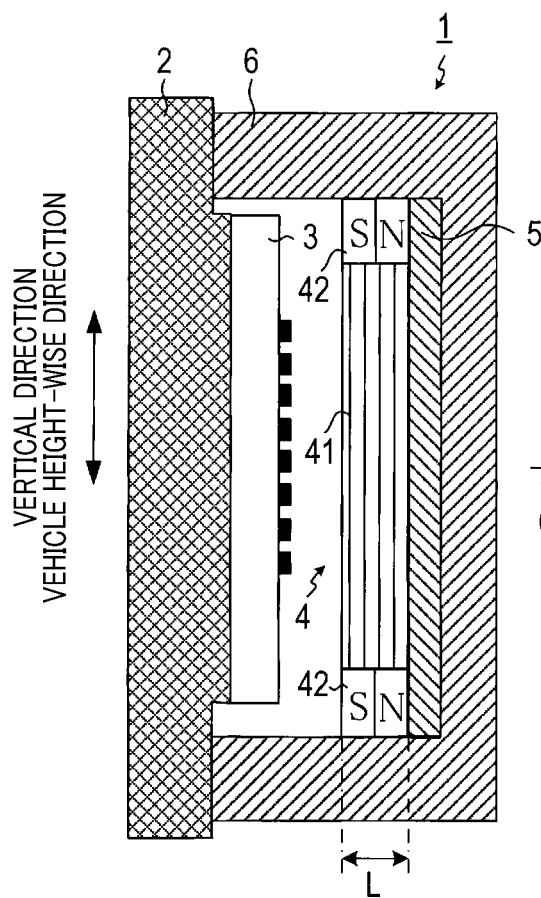
FIG. 2(a) is a sectional view taken across a line A-A in the plan view.
Figure 2B:
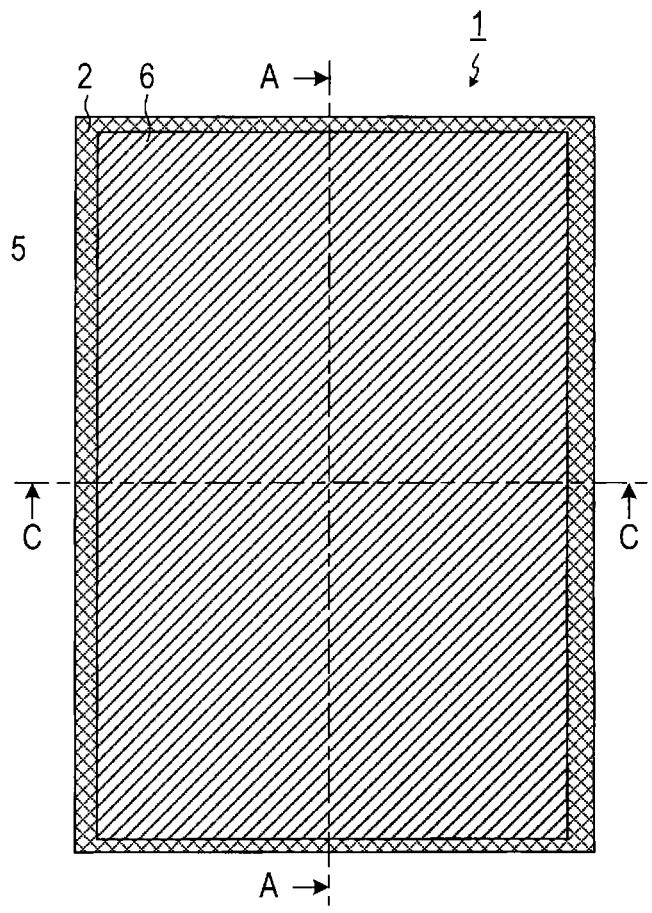
FIG. 2(b) is a plan view.
Figure 2C:
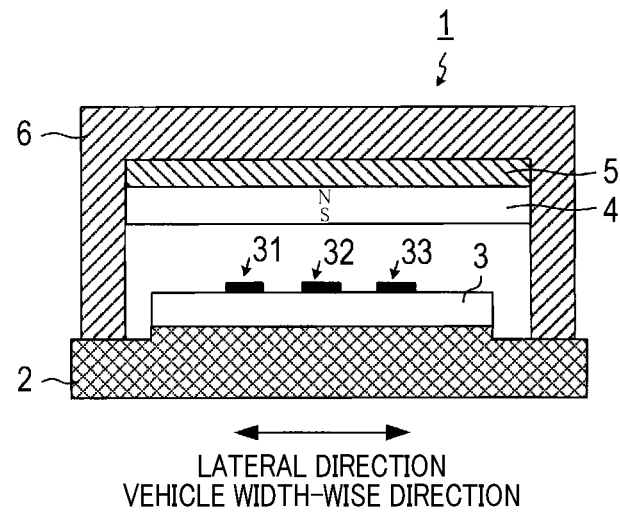
FIG. 2(c) is a sectional view taken across a line B-B in the plan view.

The radar apparatus 1 is, as illustrated in FIG. 2, equipped with the radar unit 2, the antenna unit 3, the magnetic unit 4, the polarizing filter 5, and the cover 6.

The radar unit 2 has a transmitter-receiver circuit and a signal processor. The transmitter-receiver circuit works to transmit or receive a probe wave through the antenna unit 3. The signal processor works to process a received signal which is derived by the transmitter-receiver circuit to obtain information about an object which has reflected the probe wave.

The antenna unit 3 has a plurality of (three in the drawing) array antennas 31 to 33 each of which is made up of a plurality of (eight in the drawing) antennas arranged in line in a vertical direction. The array antennas 31 to 33 are arranged in a lateral direction. The vertical direction is a height-wise direction of the vehicle 100 in a condition where the radar apparatus 1 is mounted in the vehicle 100. The lateral direction is a width-wise direction of the system vehicle 100 in a condition where the radar apparatus 1 is mounted in the vehicle 100. One of the array antennas 31 to 33 is used as a transmitting antenna, while the other two of the array antennas 31 to 33 are used as receiving antennas.

The cover 6 is made of a dielectric material and formed in a shape of a box with one surface which covers the antenna unit 3 and is opened. The cover 6 is designed to minimize adverse effects arising from reflection of the probe wave on an interface thereof in various known ways. The explanation thereof in detail will be omitted here.

The magnetic unit 4 is equipped with the plate-like magnetic body 41 and a pair of magnets 42. The magnetic body 41 is arranged to face the antenna unit 3 within the cover 6. The magnets 42 are disposed on ends of the magnetic body 41 which are opposed to each other in the vertical direction. The magnets 42 are oriented to have S-poles all facing the antenna unit 3. The magnetic unit 4 works as a Faraday rotator to rotate a plane of polarization of an electromagnetic wave passing through the magnetic body 41 in a thickness-wise direction of the magnetic body 41 by 45 degrees. Specifically, if a Verdet constant of the magnetic body 41 is defined as V, and a magnetic field applied by the magnets 42 is defined as H, the thickness L of the magnetic body 41 is selected to meet an equation (1).

$$L = 45/(V \times H) \qquad (1)$$

Figure 3:
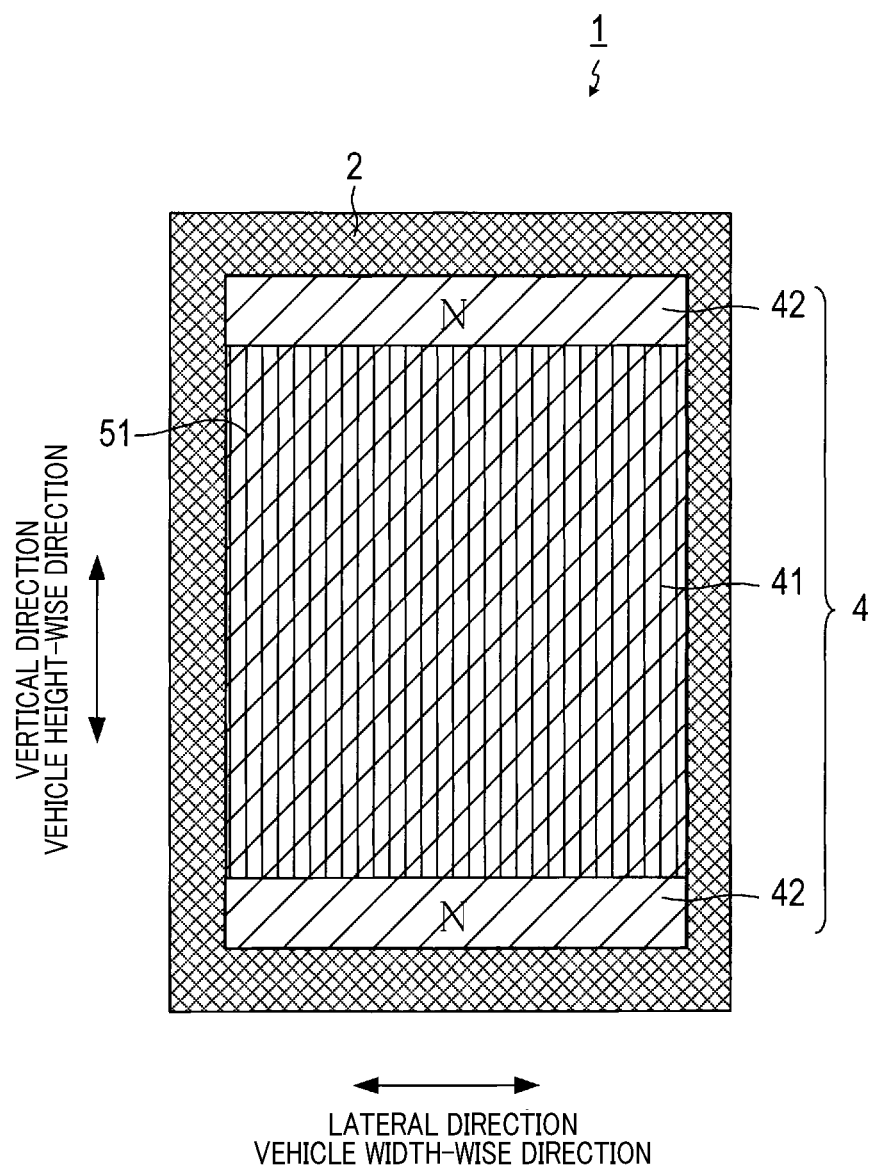
FIG. 3 is a plan view which illustrates a radar apparatus from which a cover is omitted.
Figure 4:
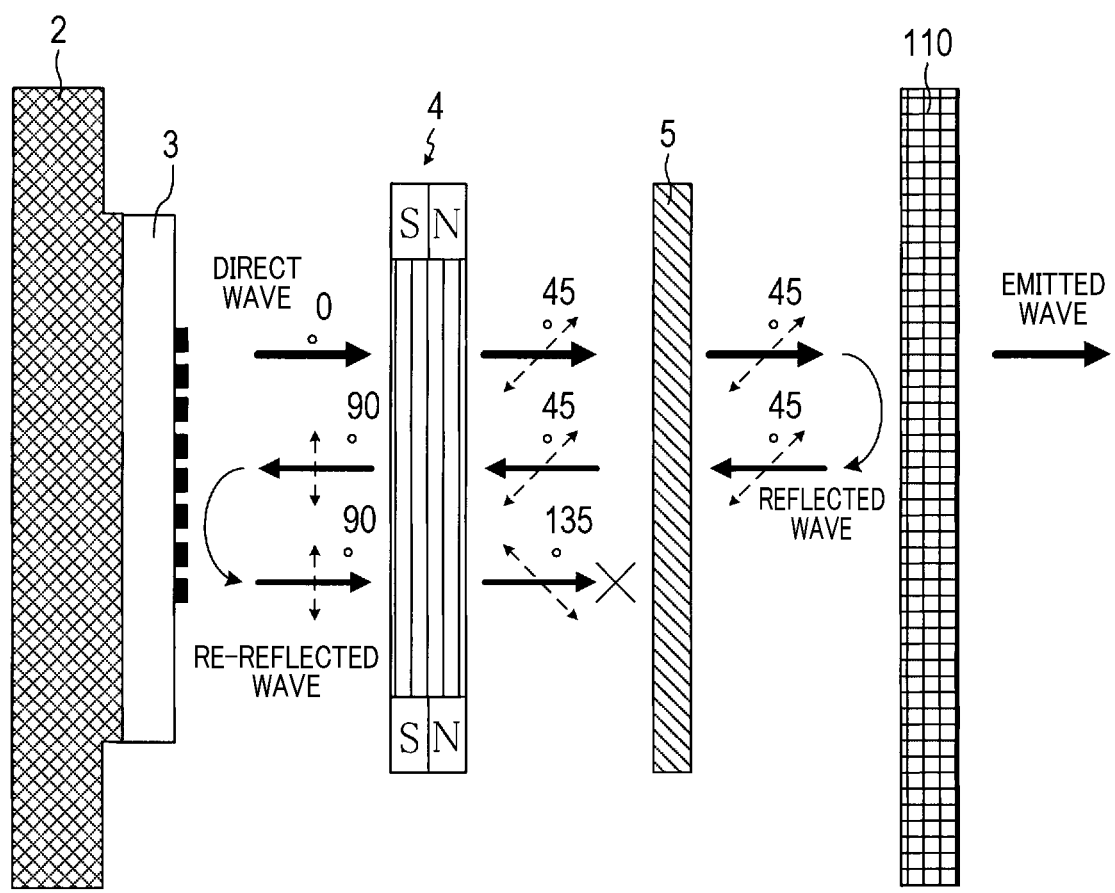
FIG. 4 is an explanatory view which shows operation of a radar apparatus.

The polarizing filter 5 is known and made up of conducting wires 51 which are arranged at an interval away from each other which is less than or equal to a wavelength of the probe wave transmitted from the antenna unit 3. The polarizing filter 5 is, like the magnetic unit 4, arranged inside the cover 6 on an opposite side of the magnetic unit 4 to the antenna unit 3. The conducting wires 51 are, as clearly illustrated in FIG. 3, inclined at 45 degrees both in the vertical direction and in the lateral direction.

[1.3 Operation]

In the radar apparatus 1 having the above structure, the plane of polarization of a direct wave that is the probe wave emitted from the antenna unit 3 is rotated by 45 degrees when passing through the magnetic unit 4 functioning as a Faraday rotator. Subsequently, the direct wave passes through the polarizing filter 5, so that only the direct wave whose plane of polarization is inclined by 45 degrees is emitted from the radar apparatus 1. In the following discussion, the angle of the plane of polarization is expressed by an angle viewed from the antenna unit 3. The direct wave is emitted outside the vehicle 100 through the bumper 110 and has a portion reflected on an inner surface of the bumper 110 as a reflected wave oriented toward the radar apparatus 1. The angle of the plane of polarization of the reflected wave is 45 degrees, so that the reflected wave will pass through the polarizing filter 5. The plane of polarization of the reflected wave which has passed through the polarizing filter 5 is rotated again by 45 degrees when passing through the magnetic unit 4. The rotation of the plane of polarization, as achieved by the Faraday effect, is non-reciprocal, so that when passing through the magnetic unit 4, the reflected wave is not subjected to backward rotation by an angle of rotation of the direct wave when passing through the magnetic unit 4, but is rotated in the forward direction, thereby causing the angle of the plane of polarization of the reflected wave to be 90 degrees. The reflected wave which has passed through the magnetic unit 4 is reflected again on the surface of the antenna unit 3 and then passes through the magnetic unit 4, so that the plane of polarization thereof is rotated by 45 degrees. This causes the plane of polarization of the re-reflected wave which has passed through the magnetic unit 4 to have an angle of 135 degrees, so that it is inclined at 90 degrees relative to 45 degrees at which the re-reflected wave is permitted to pass through the polarizing filter 5. The re-reflected wave is, thus, blocked by the polarizing filter 5, so that it is not emitted outside the radar apparatus 1, thereby causing only the direct wave outputted from the antenna unit 3 to be radiated outside the vehicle 100 through the bumper 110. The beneficial effects of the cover 6 which less impinges on the probe wave will be omitted here for facilitating understanding.

[1.4 Effects]

As apparent from the above discussion, the radar apparatus 1 works to minimize the interference between the direct wave which has been directly emitted from the antenna unit 3 and the reflected wave which has been reflected inside the bumper 110 (or a re-reflected wave which has been reflected again by the antenna unit 3) using the operations of the magnetic unit 4 and the polarizing filter 5. The radar apparatus 1 is, therefore, capable of eliminating adverse effects on waves radiated outside the vehicle through the bumper 110 which arise from the interference with the reflected wave generated in the bumper 110 (or the re-reflected wave), thereby minimizing the deterioration in radar performance resulting from the reflected wave.

The radar apparatus 1, unlike the prior art system, also works to avoid generation of a reflected wave vertically directed from the bumper 110 which usually causes noise.

Figure 5:
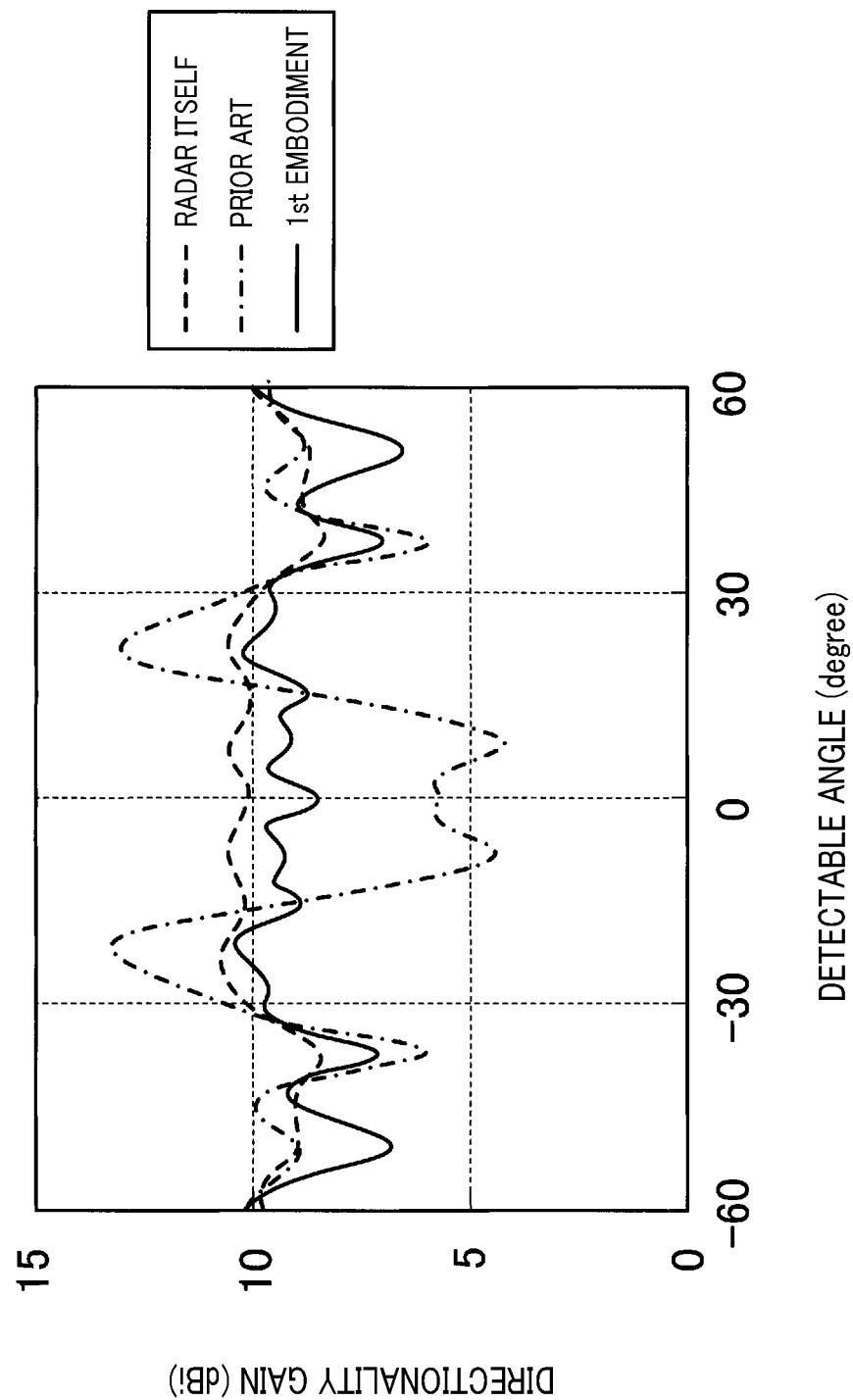
FIG. 5 is a graph which represents results of simulations of a directionality of a radar apparatus.

FIG. 5 is a graph which represents characteristics of the radar apparatus 1 in the first embodiment, characteristics of the antenna unit 3 in itself, and characteristics of a conventional radar apparatus which is equivalent to the radar apparatus 1 form which the magnetic unit 4 and the polarizing filter 5 are omitted. Note that the wavelength of an emitted wave is 4 mm, and the polarizing filter 5 is made up of copper wires which have a diameter of 1 mm and are arranged at an interval of 2 mm away from each other. The graph shows results of simulations.

The graph of FIG. 5 shows that a variation in characteristics of the radar apparatus 1 is smaller than those in the conventional radar apparatus.

2. Second Embodiment

The basic structure of the second embodiment is identical with those in the first embodiment. Only a difference therebetween will be discussed below without referring to parts common to the first and second embodiments.

Figure 6:
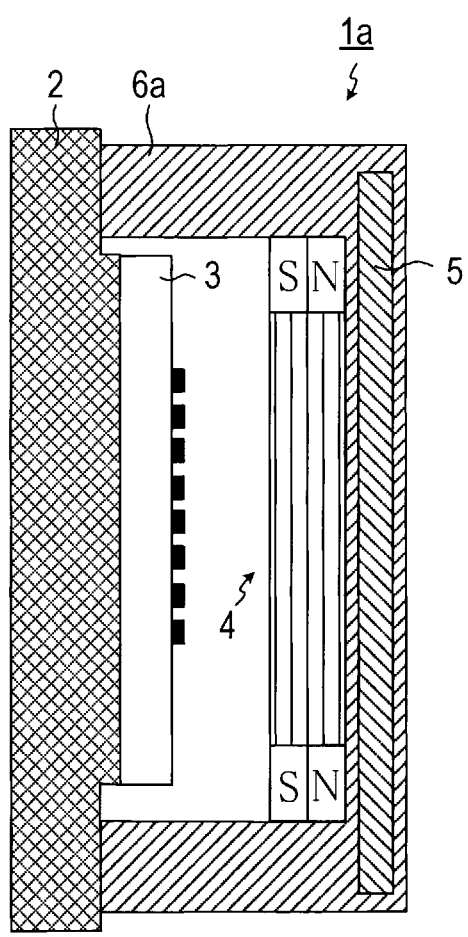
FIG. 6 is a sectional view which illustrates a radar apparatus in the second embodiment.

The radar apparatus 1a of this embodiment, as illustrated in FIG. 6, uses the cover 6a in which the polarizing filter 5 is embedded instead of the cover 6. The cover 6a also has only the antenna unit 3 and the magnetic unit 4 arranged therein.

The thus constructed radar apparatus 1a offers the same beneficial advantages as those in the radar apparatus 1 of the first embodiment.

3. Third Embodiment

The basic structure of the third embodiment is identical with those in the first embodiment. Only a difference therebetween will be discussed below without referring to parts common to the first and third embodiments.

Figure 7:
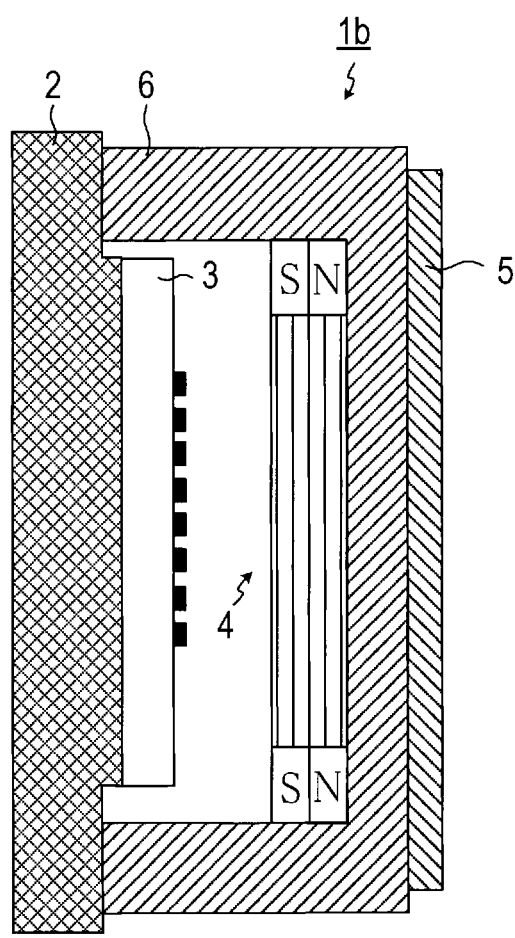
FIG. 7 is a sectional view which illustrates a radar apparatus in the third embodiment.

The radar apparatus 1b of this embodiment, as illustrated in FIG. 7, has the polarizing filter 5 disposed not inside, but outside the cover 6. The cover 6 has only the antenna unit 3 and the magnetic unit 4 arranged therein.

The thus constructed radar apparatus 1b offers the same beneficial advantages as those in the radar apparatus 1 of the first embodiment.

4. Fourth Embodiment

The basic structure of the fourth embodiment is identical with those in the first embodiment. Only a difference therebetween will be discussed below without referring to parts common to the first and fourth embodiments.

Figure 8:
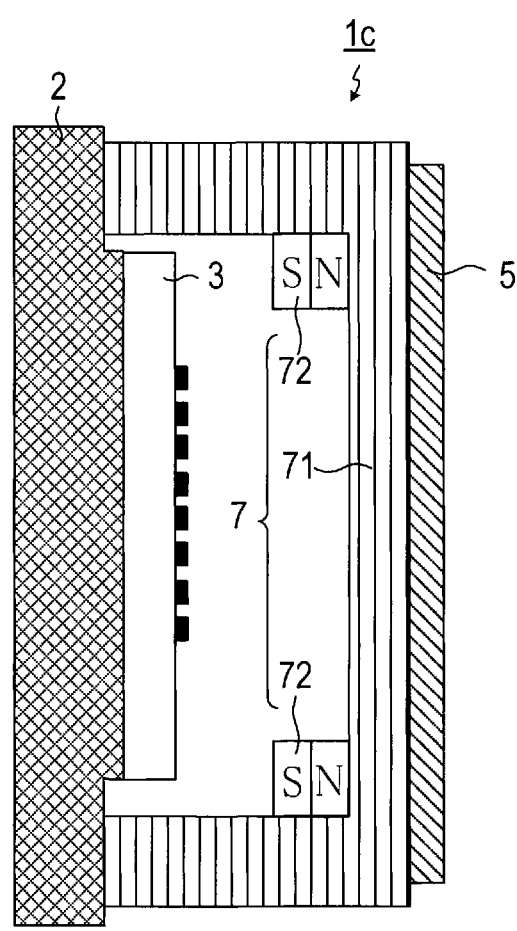
FIG. 8 is a sectional view which illustrates a radar apparatus in the fourth embodiment.

The radar apparatus 1c of this embodiment, as illustrated in FIG. 8, has the cover 71 made of magnetic material. The cover 71 has the magnets 72 attached to vertically-opposed ends of an inner surface thereof. The cover 71 and the magnets 72 constitute the magnetic unit 7 working as a Faraday rotator. The polarizing filter 5 is arranged outside the cover 71. The cover 71 has the antenna unit 3 and the magnets 72 disposed therein.

The thus constructed radar apparatus 1c offers the same beneficial advantages as those in the radar apparatus 1 of the first embodiment.

5. Fifth Embodiment

The basic structure of the fifth embodiment is identical with those in the first embodiment. Only a difference therebetween will be discussed below without referring to parts common to the first and fifth embodiments.

[5.1. Structure]

Figure 9:
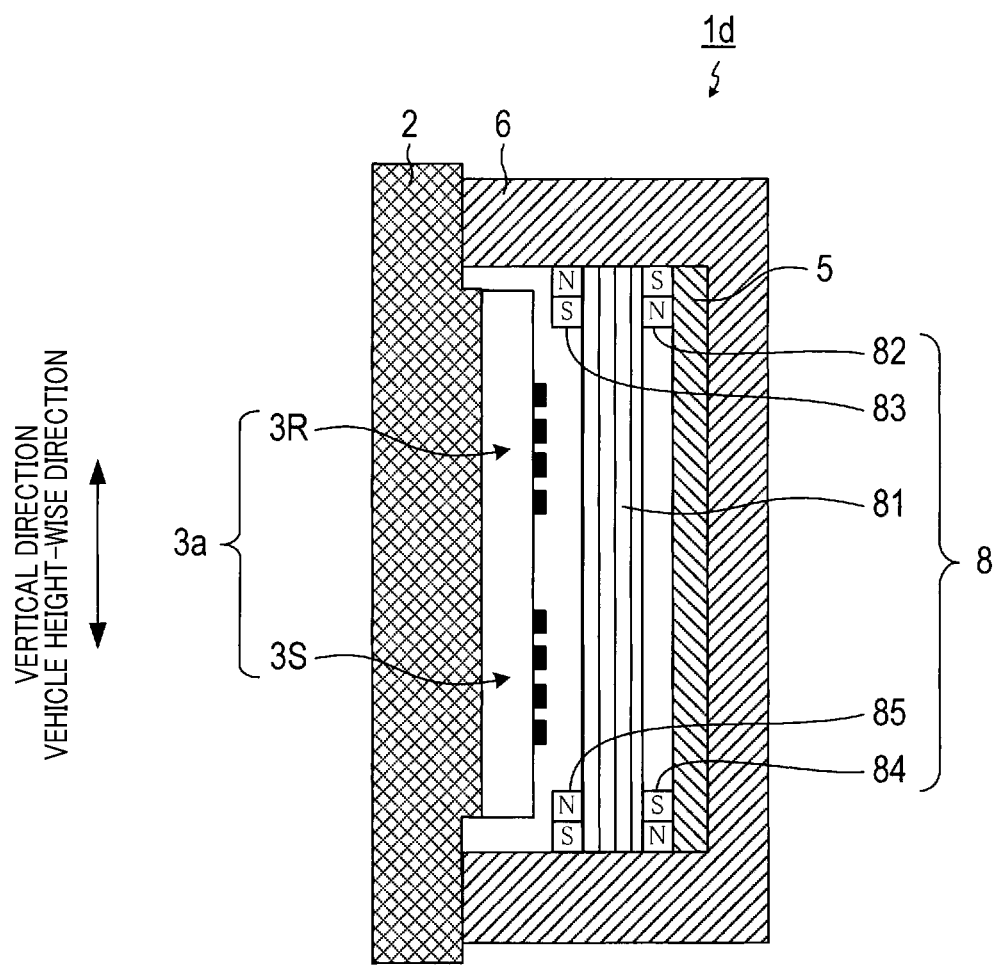
FIG. 9 is a sectional view which illustrates a radar apparatus in the fifth embodiment.

The radar apparatus 1d of this embodiment has, as can be seen in FIG. 9, the antenna unit 3a and the magnetic unit 8 which are different in structure from the antenna unit 3 and the magnetic unit 4 in the first embodiment.

The antenna unit 3a is equipped with the transmitting antenna unit 3S and the receiving antenna unit 3R which are aligned in the vertical direction. The transmitting antenna unit 3S and the receiving antenna unit 3R have the same structure in which a plurality of (e.g., three) array antennas each of which is made up of a plurality of (e.g., four) antennas arranged vertically in line are arranged in the lateral direction.

The magnetic unit 8 includes the plate-like magnetic body 81 and four magnets 82 to 85. The magnetic body 81 is disposed inside the cover 6 and faces the antenna unit 3a. The magnets 82 and 83 are arranged on opposite sides of the magnetic body 81 on an upper end portion of the magnetic body 81. The magnets 84 and 85 are arranged on opposite sides of the magnetic body 81 on a lower end portion of the magnetic body 81. The magnets 82 and 84 which are located on the magnetic body 81 and face the polarizing filter 5 each have the S-pole facing upward and the N-pole facing downward. The magnets 83 and 85 which are located on the magnetic body 81 and face the antenna unit 3a each have, in contrast to the magnets 82 and 84, the N-pole facing upward and the S-pole facing downward.

Specifically, a magnetic field which is oriented from the polarizing filter 5 toward the antenna unit 3a is applied to an upper half of the magnetic body 81, while a magnetic field which is oriented from the antenna unit 3a toward the polarizing filter 5 is applied to a lower half of the magnetic body 81. Therefore, a lower half of the magnetic unit 8 which faces the transmitting antenna unit 3S functions as a Faraday rotator to rotate the plane of polarization of an electromagnetic wave passing therethrough by −45 degrees. Similarly, an upper half of the magnetic unit 8 which faces the receiving antenna unit 3R functions as a Faraday rotator to rotate the plane of polarization of an electromagnetic wave passing therethrough by 45 degrees.

[5.2 Operation]

Figure 10:
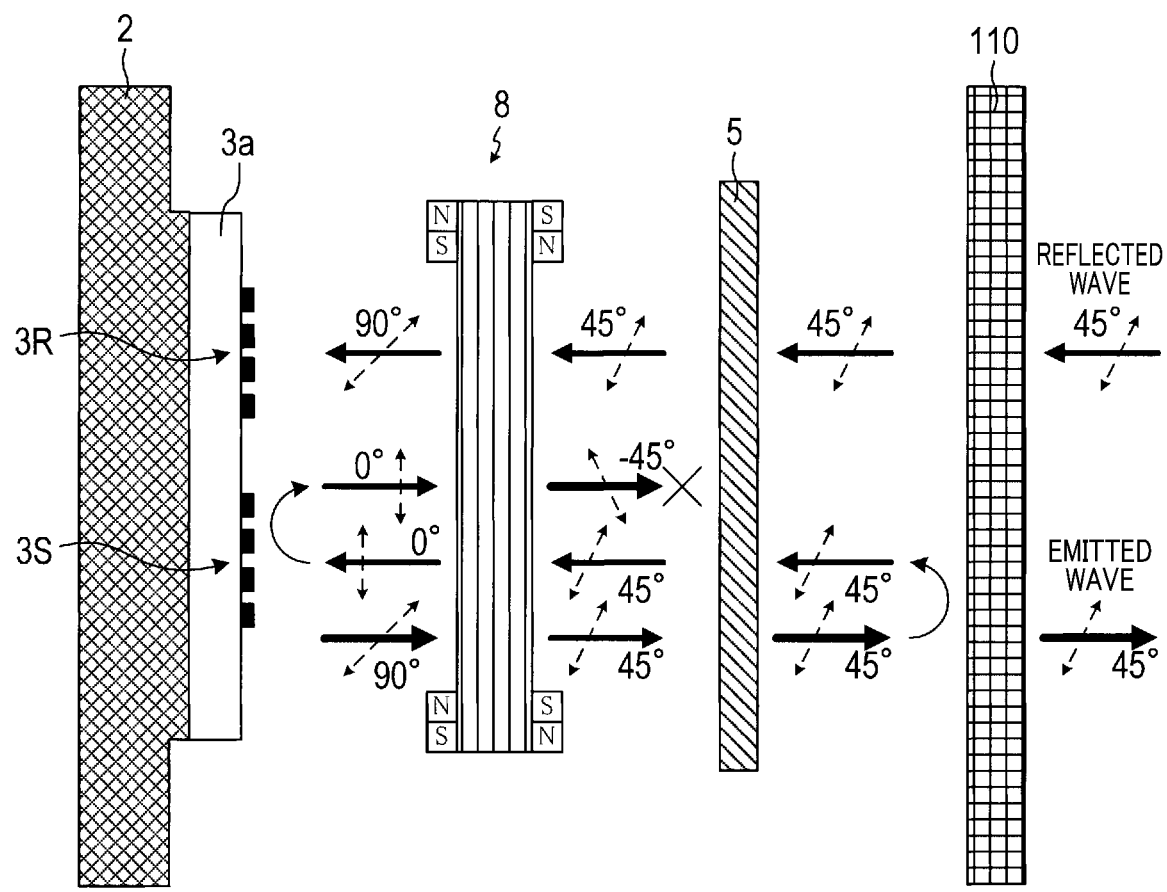
FIG. 10 is an explanatory view which shows an operation of a radar apparatus in the fifth embodiment.

In the thus constructed radar apparatus 1d, as demonstrated in FIG. 10, a direct wave which is a probe wave emitted from the transmitting antenna unit 3S, that is, a horizontally polarized wave whose angle of a plane of polarization is 90 degrees has the plane of polarization rotated by −45 degrees when passing through the magnetic unit 8. In other words, after passing through the magnetic unit 8, the direct wave has the plane of polarization inclined at 45 degrees. Subsequently, the direct wave then passes through the polarizing filter 5, so that only the direct wave whose plane of polarization is inclined at 45 degrees is emitted from the radar apparatus 1. A subsequent operation is the same as in the first embodiment.

A reflected wave coming from an object which has reflected a direct wave whose plane of polarization is inclined at 45 degrees will have a plane of polarization inclined at 45 degree and enters the radar apparatus 1d. Subsequently, the reflected wave passes through the polarizing filter 5 and then through the magnetic unit 8, so that the plane of polarization thereof is rotated by 45 degrees. The reflected wave which is received by the receiving antenna unit 3R, therefore, has the plane of polarization whose angle is 90 degrees, so that it becomes a horizontally polarized wave similar to the direct wave emitted from the transmitting antenna unit 3S.

[5.3 Effects]

As apparent from the above discussion, the radar apparatus 1d offers the same beneficial advantages as those in the above described radar apparatus 1.

Figure 11:
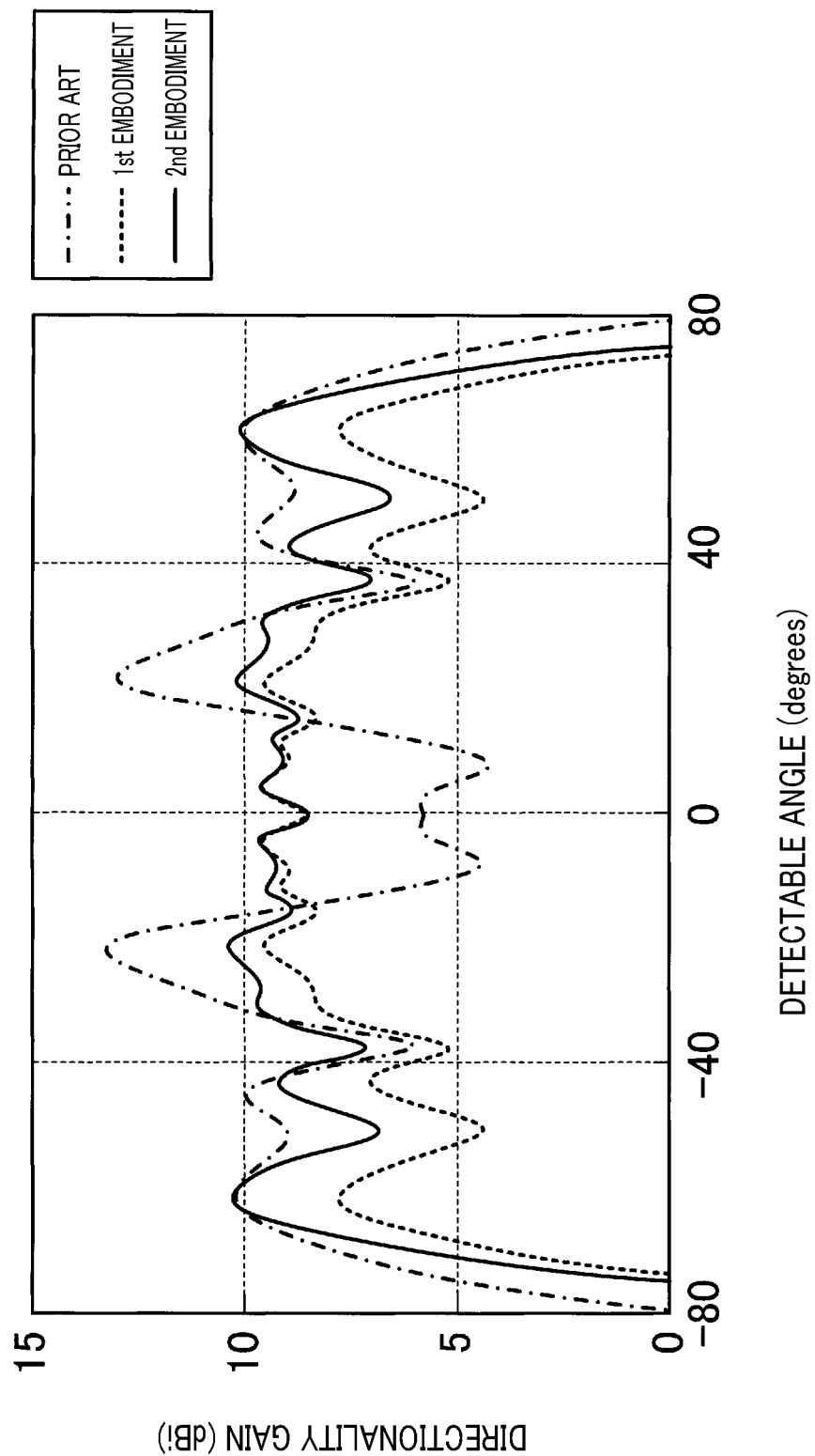
FIG. 11 is a graph which represents results of simulations about a directionality of a radar apparatus in the fifth embodiment.

The receiving antenna unit 3R of the radar apparatus 1d is capable of receiving the horizontally polarized wave identical with that emitted from the transmitting antenna unit 3S, that is, receiving, as illustrated in FIG. 11, a wave reflected from a wider angular range. FIG. 11 shows that the radar apparatus 1d, as denoted as the second embodiment, has a greatly improved gain in a detecting angular range of ±20° to ±60° as compared with the first embodiment.

6. Sixth Embodiment

The basic structure of the sixth embodiment is identical with those in the fifth embodiment. Only a difference therebetween will be discussed below without referring to parts common to the fifth and sixth embodiments.

Figure 12:
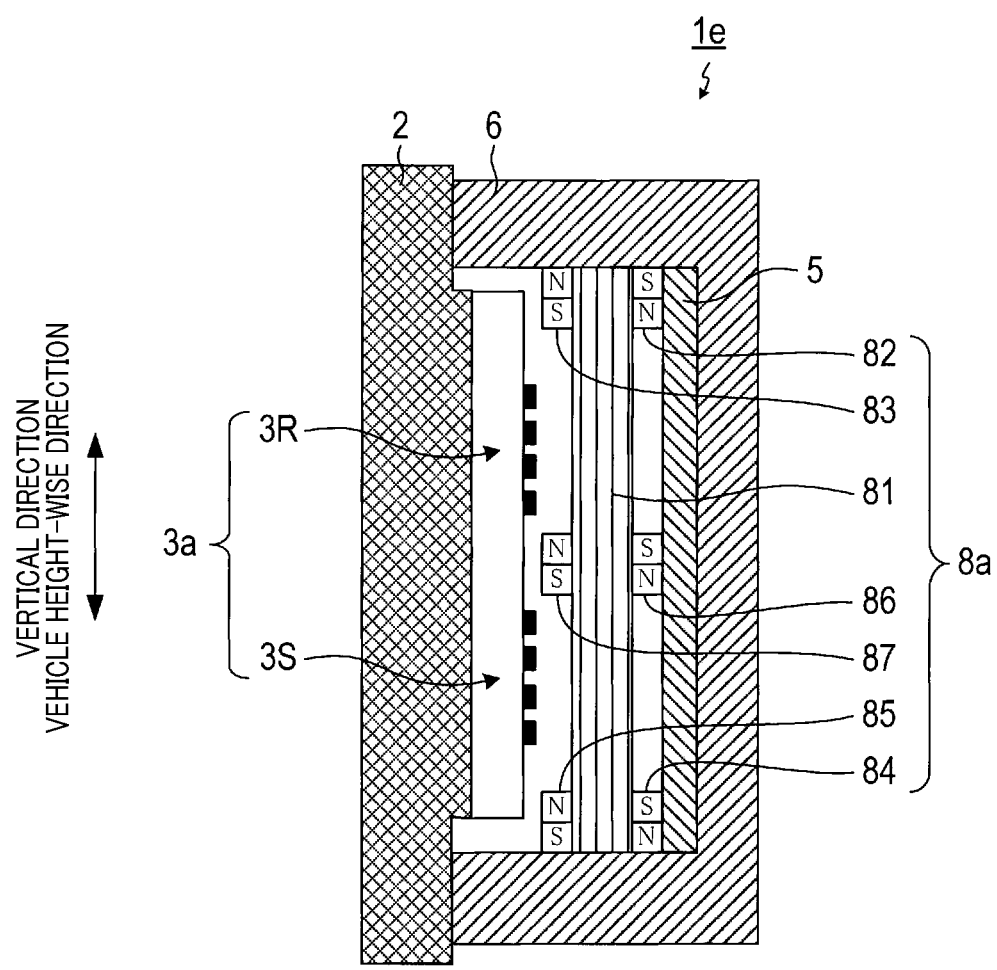
FIG. 12 is a sectional view which illustrates a radar apparatus in the sixth embodiment.
Figure 13:
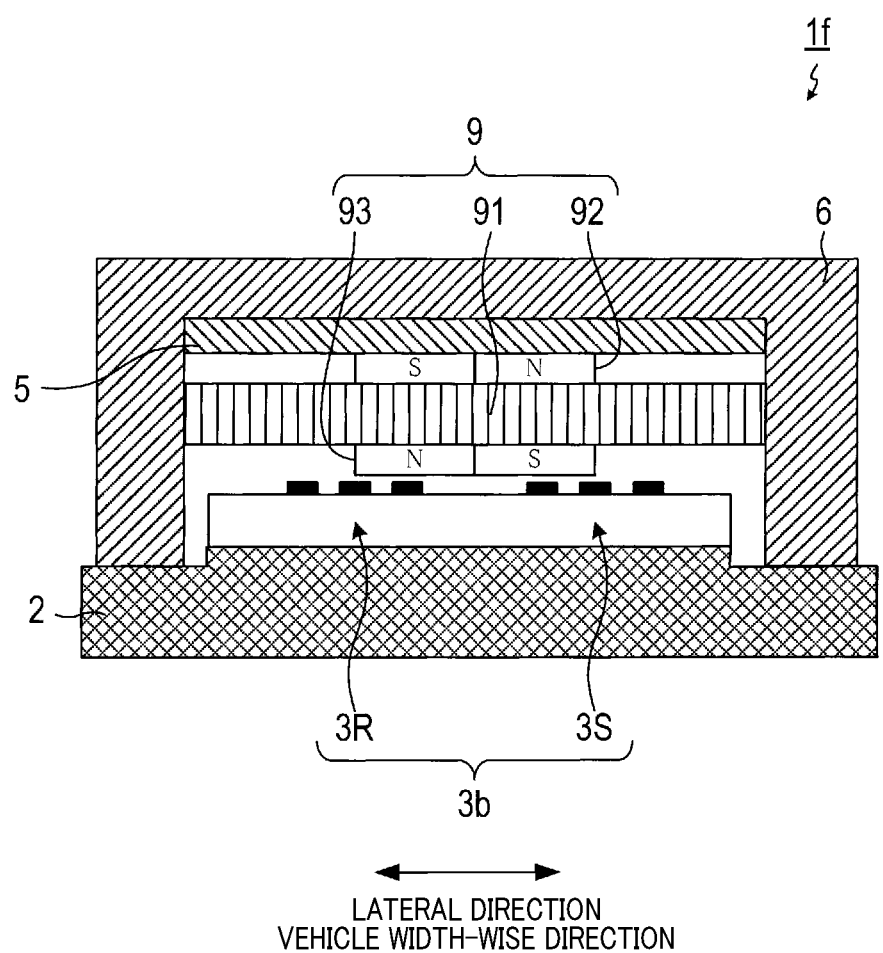
FIG. 13 is a view which shows a structure of a radar apparatus in the seventh embodiment and is a sectional view taken along the line XIII-XIII in FIG. 14.
Figure 14:
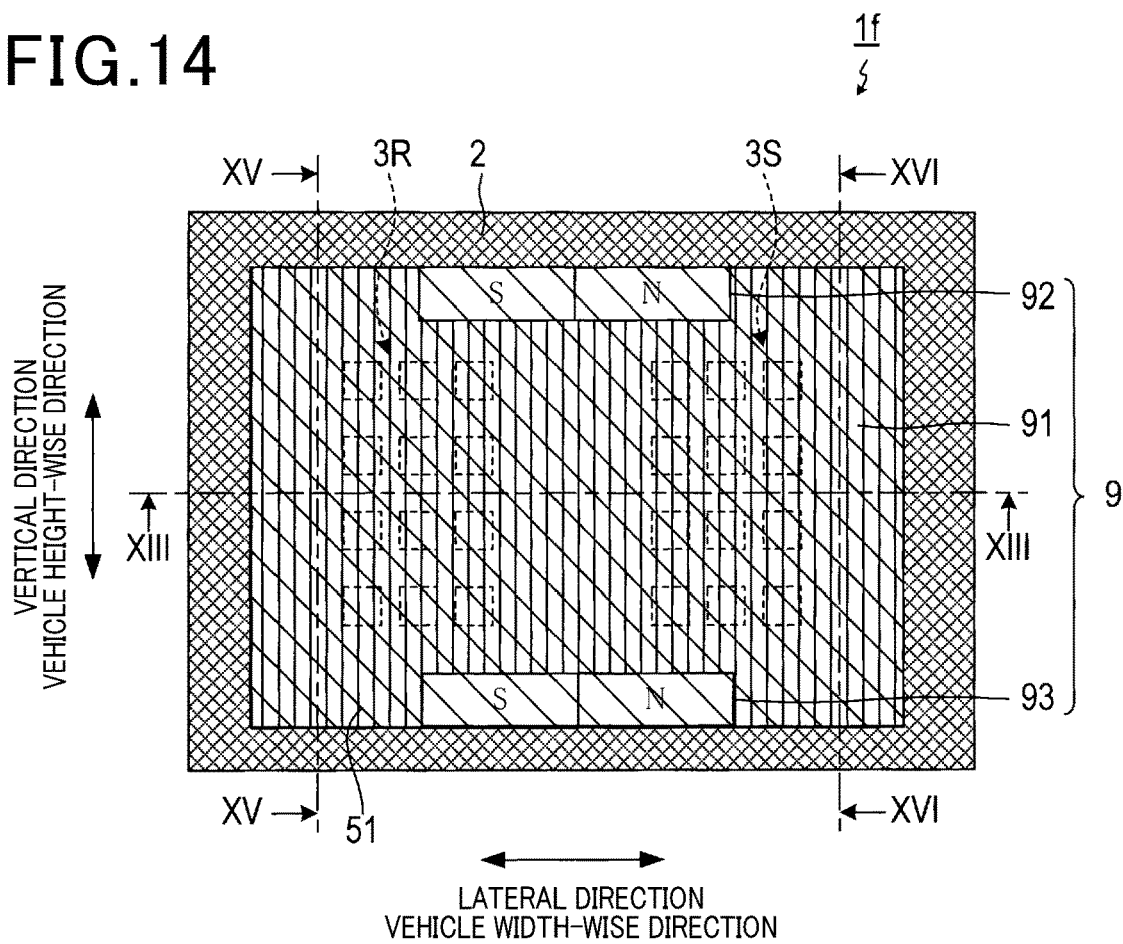
FIG. 14 is a plan view which illustrates a radar apparatus in the seventh embodiment from which a cover is omitted.
Figure 15:
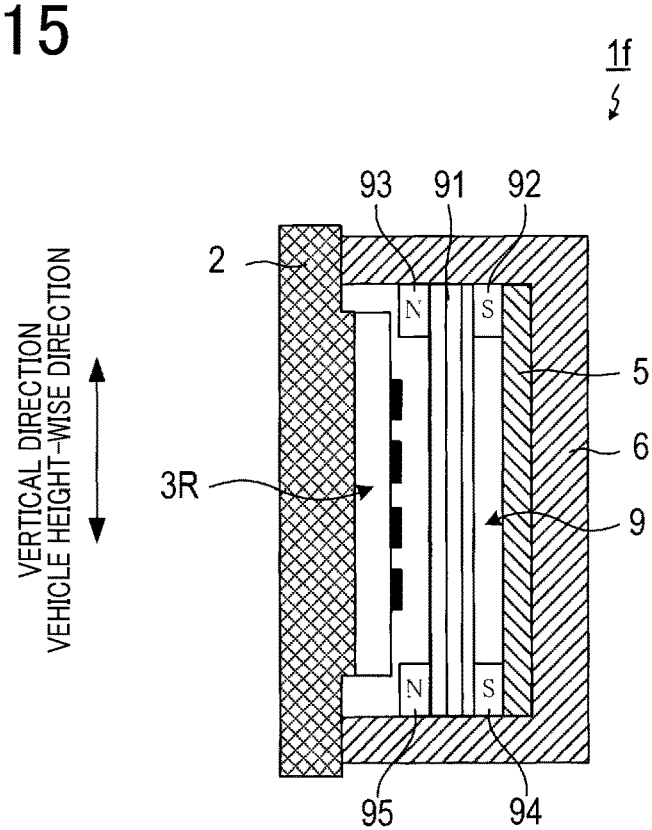
FIG. 15 is a sectional view taken across the line XV-XV in FIG. 14 which illustrates a radar apparatus in the seventh embodiment.
Figure 16:
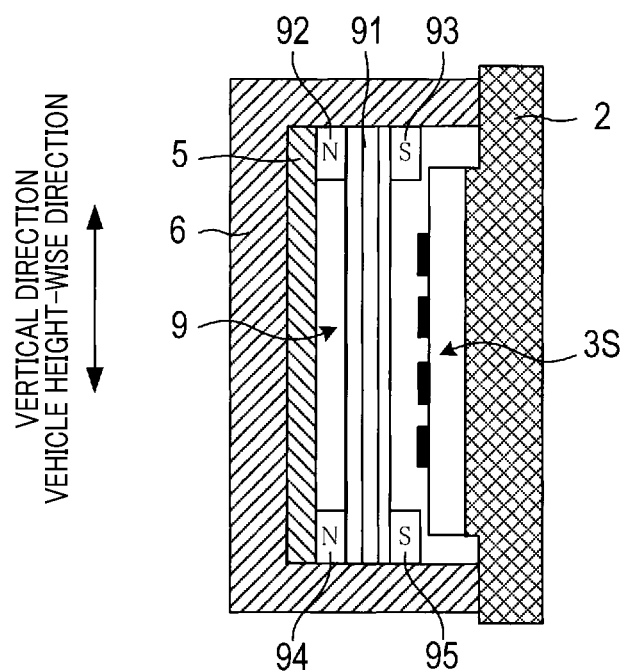
FIG. 16 is a sectional view taken across the line XVI-XVI in FIG. 14 which illustrates a radar apparatus in the seventh embodiment.

The radar apparatus 1e of this embodiment, as illustrated in FIG. 12, uses the magnetic unit 8a instead of the magnetic unit 8. The magnetic unit 8a is equipped with magnets 86 and 87 in addition to the structure of the magnetic unit 8. The magnets 86 and 87 are disposed on opposite sides of a middle portion of the magnetic body 81 in the vertical direction and face each other. The magnet 86 disposed closer to the polarizing filter 5, like the magnets 82 and 84, has the S-pole facing upward and the N-pole facing downward. The magnet 87 disposed closer to the antenna unit 3a, like the magnets 83 and 85, has the N-pole facing upward and the S-pole facing downward.

The thus constructed radar apparatus 1d offers the same beneficial advantages as in the radar apparatus 1 of the first embodiment and also has an increased strength of a magnetic field applied to the magnetic unit 8a, thereby improving the performance thereof.

7. Seventh Embodiment

The basic structure of the seventh embodiment is identical with those in the first embodiment. Only a difference therebetween will be discussed below without referring to parts common to the first and seventh embodiments.

[7.1. Structure]

The radar apparatus 1f of this embodiment, as illustrated in FIGS. 13 to 16, has the antenna unit 3b and the magnetic unit 9 which are different in structure from the antenna unit 3 and the magnetic unit 4 in the first embodiment.

The antenna unit 3b, like the antenna unit 3a, includes the transmitting antenna unit 3S and the receiving antenna unit 3R. The transmitting antenna unit 3S and the receiving antenna unit 3R of the antenna unit 3b are, unlike the antenna unit 3a, arranged in the lateral direction.

The magnetic unit 9 is equipped with the plate-like magnetic body 91 and four magnets 92 to 95. The magnetic body 91 is disposed in the cover 6 and faces the antenna unit 3b. The magnets 92 and 93 are arranged on the opposite sides of an upper end portion of the magnetic body 81. The magnets 94 and 95 are arranged on the opposite sides of a lower end portion of the magnetic body 91. The magnets 92 and 94 which are disposed on the magnetic body 91 closer to the polarizing filter 5 each have the S-pole facing the receiving antenna unit 3R and the N-pole facing the transmitting antenna unit 3S disposed adjacent the receiving antenna unit 3R in the lateral direction. In contrast to the magnets 92 and 94, the magnets 93 and 95 which are disposed on the magnetic body 91 closer to the antenna unit 3b each have the N-pole facing the receiving antenna unit 3R and the S-pole facing the transmitting antenna unit 3S disposed adjacent the receiving antenna unit 3R in the lateral direction. Additionally, each of the magnets 93 to 95 has an end of each pole lying on an extension of the center line passing through the lateral center in a region where antennas of the transmitting antenna unit 3S are arranged or an extension of the center line passing through the lateral center in a region where antennas of the receiving antenna unit 3R.

In other words, a magnetic field which is directed from the polarizing filter 5 toward the antenna unit 3b is applied to a lateral half of the magnetic body 91 which faces the transmitting antenna unit 3S, while a magnetic field which is directed from the antenna unit 3b toward the polarizing filter 5 is applied to a lateral half of the magnetic body 91 which faces the receiving antenna unit 3R. A portion of the magnetic unit 9 which faces the transmitting antenna unit 3S, therefore, functions as a Faraday rotator to rotate a plane of polarization of an electromagnetic wave passing therethrough by −45 degrees. Similarly, a portion of the magnetic unit 9 which faces the receiving antenna unit 3R functions as a Faraday rotator to rotate a plane of polarization of an electromagnetic wave passing therethrough by 45 degrees.

[7.2. Effects]

As apparent from the above discussion, the radar apparatus 1f offers the same beneficial advantages as those in the radar apparatus 1d. The radar apparatus 1f is equipped with the magnets 92 to 95 each of which is arranged to have the top end of each pole lying at the lateral center of the transmitting antennal unit 3S or the receiving antenna unit 3R, thereby enhancing the efficiency in applying a magnetic field to a portion of the magnetic body 91 facing the transmitting antenna unit 3S or the receiving antenna unit 3R.

8. Other Embodiments

While the embodiments of the invention have been referred to, the invention are not limited to the above embodiments, but may be modified in various ways.

(1) The above embodiments have referred to the radar apparatus 1 mounted in the vehicle, but the radar apparatus 1 may be disposed to transmit or receive a probe wave through a cover.

(2) The function of one of the components in the above embodiments may be shared with some of the components. Alternatively, the functions of some of the components may be combined in one of the components. One or some of the components of the above embodiments may be omitted. At least a portion of the components of one of the above embodiments may be added to or replaced with the component(s) of the other embodiments. The embodiments of the invention may include various modes contained in technical ideas specified by wording of the appended claims.

(3) In addition to the above described radar apparatuses, the invention may be embodied in various modes, such as systems including the above described radar apparatuses or interference control methods.

What is claimed is:

1. A radar apparatus comprising:
   an antenna unit which transmits and/or receives a probe wave made of an electromagnetic wave;
   a magnetic body which is arranged at a location where the probe wave transmitted or received by said antenna unit passes;
   one or more magnets which generate a magnetic field along a direction in which the probe wave propagates; and
   a polarizing filter which is arranged on an opposite side of said magnetic body to said antenna unit.

2. A radar apparatus as set forth in claim 1, wherein said magnetic body is shaped to have a thickness to rotate a plane of polarization of said probe wave passing through said magnetic body by 45 degrees.

3. A radar apparatus as set forth in claim 1, wherein said one or more magnets are disposed at a location to cover a portion through which said probe wave passes.

4. A radar apparatus as set forth in claim 1, wherein said polarizing filter has a structure in which conductive wires are arranged at an interval away from each other which is less than or equal to a wavelength of said probe wave.

5. A radar apparatus as set forth in claim 1, further comprising a cover which covers said antenna unit and said magnetic body, and wherein said polarizing filter is disposed inside said cover.

6. A radar apparatus as set forth in claim 1, further comprising a cover which covers said antenna unit and said magnetic body, and wherein said polarizing filter is embedded in said cover.

7. A radar apparatus as set forth in claim 1, further comprising a cover which covers said antenna unit and said magnetic body, and wherein said polarizing filter is disposed outside said cover.

8. A radar apparatus as set forth in claim 1, wherein said magnetic body is shaped to cover said antenna unit.

9. A radar apparatus as set forth in claim 1, wherein said antenna unit is equipped with a transmitting antenna unit which transmits said probe wave and a receiving antenna unit which receives said probe wave, and wherein said one or more magnets are disposed to generate a first magnetic field in a portion of said magnetic body through which said probe wave, as emitted from the transmitting antenna unit, passes and also generate a second magnetic field in a portion of said magnetic body through which the probe wave to be received by said receiving antenna unit passes, the first and second magnetic fields being oriented in opposite directions.

10. A radar apparatus as set forth in claim 9, wherein said one or more magnets are disposed on opposite sides of the magnetic body which faces said antenna unit and said magnetic body, respectively, and wherein the one or more magnets which opposed to each other through the magnetic body are arranged to have poles different from each other.

11. A radar apparatus as set forth in claim 10, wherein the one or more magnets which are arranged on one side of the magnetic body which faces one of the antenna unit and the magnetic body are disposed to have poles oriented in the same direction.

* * * * *